Figure 1:
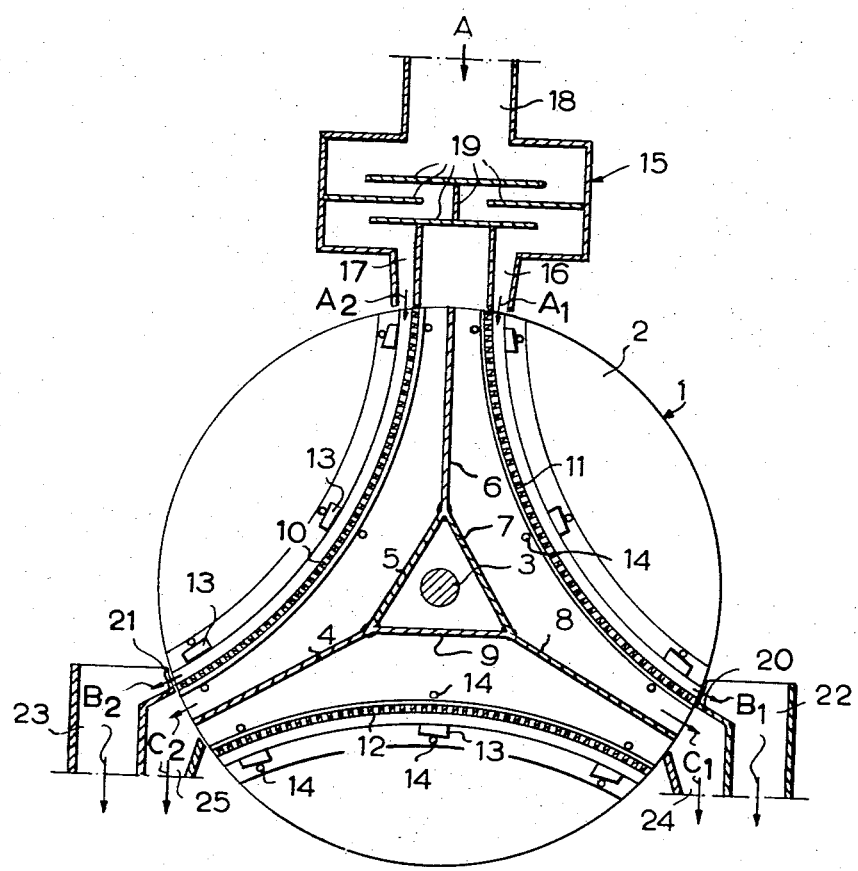

Aug. 4, 1964

J. N. J. LEEMAN 3,143,494

APPARATUS FOR SEPARATING PARTICLES ACCORDING TO SIZE

Filed Feb. 7, 1961

2 Sheets-Sheet 1

Aug. 4, 1964  J. N. J. LEEMAN  3,143,494
APPARATUS FOR SEPARATING PARTICLES ACCORDING TO SIZE
Filed Feb. 7, 1961  2 Sheets-Sheet 2

3,143,494
APPARATUS FOR SEPARATING PARTICLES ACCORDING TO SIZE

Jan N. J. Leeman, Heerlen, Netherlands, assignor to Stamicarbon N.V., Heerlen, Netherlands
Filed Feb. 7, 1961, Ser. No. 87,674
Claims priority, application Netherlands Feb. 12, 1960
8 Claims. (Cl. 209—251)

This invention relates to particle separation and more particularly to improvements in apparatus for separating particles.

In U.S. Patent No. 2,748,941, there is disclosed a screening device provided with a screening deck having the shape of a segment of a cylindrically curved surface, feed means having at least one opening for tangentially feeding a liquid and a mixture of particles to be separated over the full width and onto the concave side of the screening deck, perpendicularly to the generatrices thereof, and means for collecting the separated fractions. The screening deck is fitted in a holder which can turn on a horizontal shaft parallel to the generatrices of the screening deck so that in one position the one end of the screening deck connects with the feed means, and in the other position the other end of the screening deck connects with the feed means.

With this device, by periodically interchanging the feed end and the discharge end of the screening deck, the stream of the material along the screening deck can be periodically made to change its direction, as a result of which a uniform wear of the screening deck and a separation at a constant particle size can be insured.

The space required for this device depends on the size of the screening deck and the space occupied by the holder and the screening deck during turning. The dimensions of the screening deck depend on the amount of material to be treated.

In Dumont application Serial No. 62,598, filed October 14, 1960, now Patent No. 3,047,150, there is disclosed an apparatus embodying two screening decks which are mounted for movement into interchangeable reversed relation so as to render the device capable of treating approximately twice the amount of material as the prior device mentioned above while at the same time requiring substantially the same space for reversibility.

The apparatus disclosed in the Dumont application includes a main feed means having two parallel outlets for feeding both of the screening decks simultaneously in both of their reversed positions. Thus, with this arrangement both the screening decks were always in operation so long as feeding means was issuing particles and suspending liquid. In the event that it became necessary to remove one of the screens for purposes of replacement or the like, it was necessary to shut down the entire apparatus.

An object of the present invention is the provision of an apparatus which obtains all of the advantageous results of the Dumont apparatus but which embodies at least three screening decks mounted so that two of the screening decks can be maintained in operation at all times, except during the reversal procedure, and the third screening deck is capable of being removed for purposes of replacement or the like during the operation of the other two.

Still another object of the present invention is the provision of apparatus of the type described which embodies four separate screening decks mounted for movement together into four positions of rotation in which each screening deck is disposed in one of the following four positions: (1) a first operative position with one end acting as the feed end; (2) a second operative position with the opposite end acting as the feed end and (3) and (4) positions in which the screening decks disposed therein can be replaced during the operation of the screening decks disposed in first and second operative positions or alternatively separated while in such third and fourth positions.

These and other objects of the present invention will become more apparent during the course of the following detailed description and appended claims.

The invention may best be understood with reference to the accompanying drawings wherein an illustrative embodiment is shown.

Figure 2:
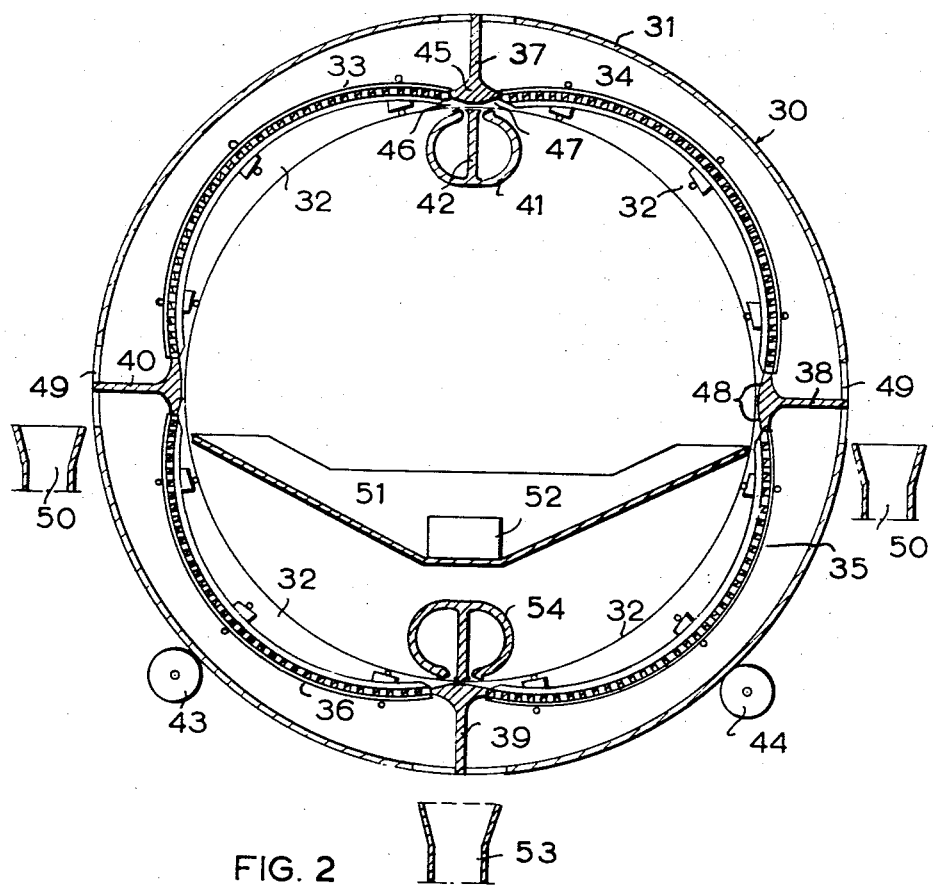

In the drawings:

FIGURE 1 is a vertical sectional view showing one form of an apparatus embodying the principles of the present invention; and FIGURE 2 is a view similar to FIGURE 1 showing another form of apparatus embodying the principles of the present invention.

Referring now more particularly to the drawings, there is shown in FIGURE 1 one form of an apparatus which embodies the principles of the present invention. The apparatus includes a casing 1 which, as shown, is made up of a pair of parallel head plates or disks 2 suitably fixed to a centrally disposed horizontally extending shaft 3 and having a partition structure extending therebetween. As shown, the partition structure includes three radially extending walls 4, 6 and 8 respectively disposed in equally spaced circumferential arrangement with respect to the disks 2. The outer end of each radial wall extends to a position adjacent the outer periphery of the disks while the inner end thereof is fixed to one pair of adjacent ends of three interconnected, inner tangentially extending walls 5, 7 and 9.

Disposed between the head plates or disks 2 in spaced relation to the partition structure are three screening decks 10, 11 and 12, each suitably removably mounted in the casing 1 by any suitable means, such as by wedges 13 and projections 14 provided on the head plates 2, as shown.

Positioned over one pair of adjacent screening deck ends is a feed device 15 provided with two slot like nozzles 16 and 17 of equal dimensions and a feed pipe 18. Between the feed pipe 18 and the nozzles 16 and 17 are a number of partitions 19 which serve to insure that an equal and constant feed rate of the material suspended in a liquid is maintained to the screening decks. The discharge ends of the screening decks cooperating with the feed device communicate with discharge devices including plates 20 and 21, each disposed in spaced relation to the discharge end of the associated screening deck a distance equal to the width of the openings on the screening decks measured in a direction perpendicular to the generatrices of the screening deck. The plates 20 and 21 of the discharge devices separate the same into overflow hoppers 22 and 23 respectively and underflow hoppers 24 and 25 respectively. It will be noted that the partitions 4–9 and the head plates 2 form the spaces in which the underflow fractions are collected.

In FIGURE 2 there is shown another form of apparatus embodying the principles of the present invention which includes a casing 30 formed by a plate 31 of cylindrical curvature between annular end walls 32. Removably mounted in the casing are four cylindrically curved screening decks 33, 34, 35 and 36. The adjacent ends of each pair of adjacent screening decks are placed close together and are arranged in pairs on the circumference of a cylinder concentric with the axis of the cylindrical plate 31. The side walls 32 are radially connected by extending partitions 37, 38, 39 and 40. These partitions and the wall 31 form four chambers for collecting the underflow fractions from the screening decks. A feeding device 41, which is divided into two compartments by a partition 42, is so arranged within the annular side walls 32 that it does not interfere with the rotation of the casing 30 on two guide rollers 43 and 44.

The partitions 37–40 are provided with widened sections 45 provided with guiding surfaces 48, which, together with the outlet openings of the feeding device, form slot-shaped openings 46 and 47. These guiding surfaces also serve to guide the overflow fractions to their hopper 51, which is provided with a lateral discharge opening 52. Formed in the wall 31 of the casing 30 are openings 49 through which the underflow fractions from the screening decks can pass to the hoppers 50.

The device illustrated in FIGURE 2 allows many variations within the scope of the invention. Thus, the screening decks may, for instance, be placed concentric with the axis of the casing 30. The feeding device 41 may be disposed over the bottom part of the casing, so that the streams of suspension displaced along the screening decks upwards from the bottom. In that case the device collecting the overflow fraction need not be modified and only a lower underflow hopper 53 will be used. As shown, it is preferable for the above constructions to be so combined that the screening decks can be fed both from the top and from the bottom as by feeding device 41 and a second feeding device 54, in which case all four screening decks are in operation at the same time. Every time the screening decks have to be exchanged, two screening decks together with their communal feeding device can be put out of operation.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. In a particle separation apparatus for separating a mixture of liquid suspended particles according to size, wherein a plurality of substantially identical screening decks, each having the shape of a segment of a cylindrically curved surface, are employed to accomplish the desired separating, the improvement comprising arranging said screening decks with adjacent ends in closely spaced pairs on the circumference of a cylinder concentric with the axis of rotation of such cylinder, said screening decks being non-coincident with each other and with the circumference of said cylinder, feed means for at least one of said closely spaced pairs of screening decks for feeding the mixture of particles and a suspending liquid at said adjacent ends of said screening decks and over the full width of the associated screening decks substantially tangentially onto the concave sides thereof in a direction perpendicular to the generatrices of said cylindrically curved screening decks, said feed means being fixedly disposed in adjacent relation to one of said spaced pairs of screening decks on opposite sides of a vertical plane, said feed means being so formed that in each operative position of said apparatus both said adjacent ends of said one closely spaced pair of screening decks can be supplied by said feed means simultaneously and at a substantially equal rate, means for removably mounting the screening decks and means for mounting said plurality of screening decks for rotational movement together about a common axis disposed in said vertical plane into at least three different positions of rotation in which a different one of said plurality of screening decks is disposed in each of the following three positions: (1) a first operative position with one end adjacent said feed means to receive particles and a suspending liquid fed therefrom; (2) a second operative position with the opposite end adjacent said feed means to receive particles and a suspending liquid fed therefrom; and (3) a third position spaced from said feed means whereby the screening deck therein can be removed while two other screening decks are in operation in said first and second operative positions.

2. Apparatus as defined in claim 1 wherein said plurality of screening decks includes at least four mounted for movement together by said mounting means into four positions of rotation in which each of said four screening decks is disposed in a different one of the following four positions: (1) said first operative position; (2) said second operative position; (3) said third position; and (4) a fourth position spaced from said feed means whereby the screening deck therein can be removed while the two screening decks disposed in said first and second operative positions are in operation.

3. Apparatus as defined in claim 2 including feed means for the screening decks disposed in each of said third and fourth positions for feeding a mixture of particles and a suspending liquid at one end over the full width of the associated screening deck substantially tangentially onto the concave side thereof in a direction perpendicular to the generatrices thereof, said third and fourth position feeding means being fixedly disposed in adjacent relation on opposite sides of said vertical plane in spaced relation to said first mentioned feeding means.

4. Apparatus as defined in claim 1 including means for collecting and discharging an undersize fraction passing through both of said screening decks when disposed in either of said operative positions and means for collecting and discharging an oversize fraction issuing from the end of each screening deck remote from the associated feed means when said screening decks are disposed in either of said operative positions.

5. Apparatus as defined in claim 4 wherein each of said oversize collecting and discharging means is spaced from the discharge end of the associated screening deck a distance not greater than the width of the screening deck openings measured in a direction perpendicular to the generatrix thereof.

6. Apparatus as defined in claim 1 wherein the convex sides of said screening decks face the axis of rotation.

7. Apparatus as defined in claim 1 wherein the concave sides of said screening decks face the axis of rotation.

8. Apparatus as defined in claim 1 wherein said segment resides between two non-coincident generatrices of said cylindrically curved surface, said segment having generatrices parallel to the generatrices of said cylindrically curved surface.

References Cited in the file of this patent

UNITED STATES PATENTS

| | | |
|---|---|---|
| 905,325 | King | Dec. 1, 1908 |
| 957,818 | Traylor | May 10, 1910 |
| 1,185,595 | Daly | May 30, 1916 |
| 1,284,669 | Haug | Nov. 12, 1918 |
| 1,640,070 | Drexler | Aug. 23, 1927 |
| 2,748,941 | Fontein | June 5, 1956 |
| 3,047,150 | Dumont | July 31, 1962 |

FOREIGN PATENTS

| | | |
|---|---|---|
| 1,238,049 | France | June 27, 1960 |